United States Patent
Zhang

(10) Patent No.: US 12,557,001 B2
(45) Date of Patent: Feb. 17, 2026

(54) USER EQUIPMENT ROUTE SELECTION POLICY DETECTION METHOD AND RELATED DEVICE, STORAGE MEDIUM, AND PROGRAM PRODUCT

(71) Applicant: TENCENT TECHNOLOGY (SHENZHEN) COMPANY LIMITED, Guangdong (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 327 days.

(21) Appl. No.: 18/382,260

(22) Filed: Oct. 20, 2023

(65) Prior Publication Data

US 2024/0049100 A1    Feb. 8, 2024

Related U.S. Application Data

(63) Continuation of application No. PCT/CN2022/135965, filed on Dec. 1, 2022.

(30) Foreign Application Priority Data

Jan. 11, 2022    (CN) .......................... 202210027123.9

(51) Int. Cl.
*H04W 40/02*     (2009.01)
*H04W 76/10*     (2018.01)

(52) U.S. Cl.
CPC ........... *H04W 40/02* (2013.01); *H04W 76/10* (2018.02)

(58) Field of Classification Search
None
See application file for complete search history.

(56) References Cited

U.S. PATENT DOCUMENTS

2022/0191765 A1 *    6/2022    Ding .................... H04W 40/24

FOREIGN PATENT DOCUMENTS

CN    112399523 A    *    2/2021    ............ H04L 45/30
CN    113708947 A        11/2021

(Continued)

OTHER PUBLICATIONS

"Deprecating OS Id and OS App Id from URSP and ATSSS rules", Apple, Broadcom, Oppo, Qualcomm Incorporated, SA2, S2-2000916, SA WG2 Meeting #136-AH, Jan. 13-17, 2020, 18 pages, Incheon, South Korea.

(Continued)

*Primary Examiner* — Kouroush Mohebbi
(74) *Attorney, Agent, or Firm* — Sughrue Mion, PLLC

(57) ABSTRACT

A user equipment (UE) route selection policy (URSP) detection method including obtaining first policy section identifier (PSI) information corresponding to a first URSP rule corresponding to a target user equipment, the first URSP rule being matched with a target service flow corresponding to the target user equipment, generating a first packet detection rule based on the first URSP rule that corresponds to the first PSI information, configuring the first packet detection rule to a user plane function (UPF) network element of a first protocol data unit (PDU) session, the first PDU session corresponding to the first URSP rule, and receiving, from the UPF network elements, a first detection result based on the first packet detection rule and indicating whether the target service flow associated with the first PDU session matches the first packet detection rule.

20 Claims, 8 Drawing Sheets

(56) References Cited

FOREIGN PATENT DOCUMENTS

WO 2020/247764 A1 12/2020
WO 2021/022460 A1 2/2021

OTHER PUBLICATIONS

International Search Report for PCT/CN2022/135965 dated Feb. 16, 2023 (PCT/ISA/210).
Written Opinion for PCT/CN2022/135965 dated Feb. 16, 2023 (PCT/ISA/237).
Extended European Search Report dated Dec. 6, 2024 in Application No. 22919956.7.

* cited by examiner

USER EQUIPMENT ROUTE SELECTION POLICY DETECTION METHOD AND RELATED DEVICE, STORAGE MEDIUM, AND PROGRAM PRODUCT

CROSS-REFERENCE TO RELATED APPLICATIONS

This application is a continuation application of International Patent Application No. PCT/CN2022/135965 filed on Dec. 1, 2022, which is based on and claims priority to Chinese Patent Application No. 202210027123.9 filed on Jan. 11, 2022, both of which being incorporated by reference herein in their entireties.

FIELD

The present disclosure relates to the field of communication technologies, and specifically, to a user equipment (UE) route selection policy (URSP) detection method, a first core network element, a target user equipment, a user plane function (UPF) network element, a communication device, a computer-readable storage medium, and a computer program product.

BACKGROUND

A user equipment (UE) policy delivered by a network side to a user equipment side includes a UE route selection policy (URSP) policy, and the URSP policy includes one or more URSP rules. However, in the related art, there is no solution for detecting whether the URSP rule is correctly executed by the UE.

SUMMARY

According to an aspect of one or more embodiments, there is provided a user equipment (UE) route selection policy (URSP) detection method including obtaining first policy section identifier (PSI) information corresponding to a first URSP rule corresponding to a target user equipment, the first URSP rule being matched with a target service flow corresponding to the target user equipment, generating a first packet detection rule based on the first URSP rule that corresponds to the first PSI information, configuring the first packet detection rule to a user plane function (UPF) network element of a first protocol data unit (PDU) session, the first PDU session corresponding to the first URSP rule, and receiving, from the UPF network elements, a first detection result based on the first packet detection rule and indicating whether the target service flow associated with the first PDU session matches the first packet detection rule.

According to additional aspects of one or more embodiments, there is also provided a first core network element and a non-transitory computer readable medium consistent with the URSP detection method.

DETAILED DESCRIPTION

Figure 1:
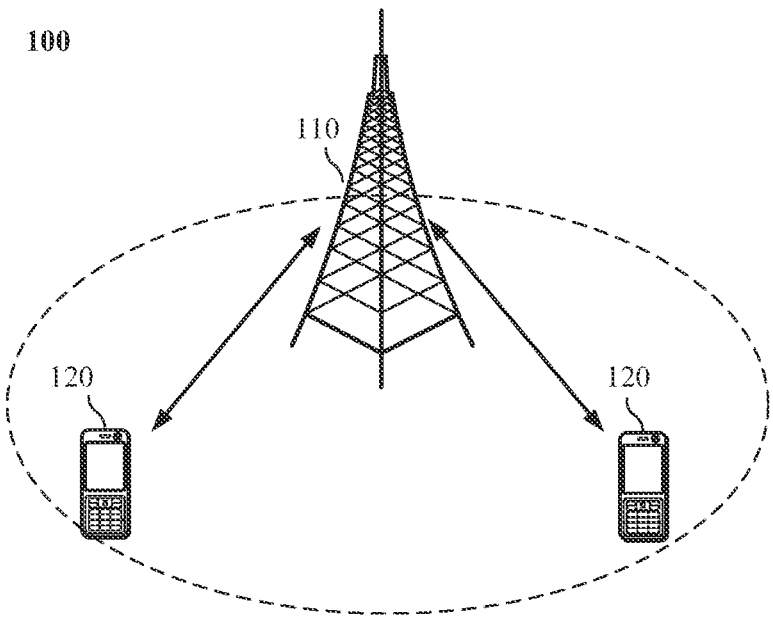
FIG. 1 is a schematic diagram of a communication system architecture according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

Various embodiments provide a URSP detection method, a first core network element, a target user equipment, a UPF network element, a communication device, a computer-readable storage medium, and a computer program product, which can determine whether a UE correctly executes a URSP rule delivered by a network side.

Some embodiments of the present disclosure provide a URSP detection method, performed by a first core network element, the method including: obtaining first policy section identifier (PSI) information corresponding to a first URSP rule reported by a target user equipment, the first URSP rule being matched with a target service flow initiated by the target user equipment; generating a first packet detection rule according to the first URSP rule obtained from the first PSI information; configuring the first packet detection rule to a user plane function (UPF) network element of a first protocol data unit (PDU) session, the first PDU session corresponding to the first URSP rule, and the first packet detection rule instructs the UPF network element to detect whether the target service flow transmitted by the target user equipment on the first PDU session is matched with the first packet detection rule, to obtain a first detection result; and receiving the first detection result transmitted by the UPF network element.

Some embodiments of the present disclosure provide a URSP detection method, performed by a target user equipment, the method including: determining, in response to initiating a target service flow, a first URSP rule matched with the target service flow, and obtaining first PSI information corresponding to the first URSP rule; and reporting the first PSI information to a first core network element, the first PSI information instructs the first core network element to generate a first packet detection rule according to the first URSP rule obtained from the first PSI information, and configure the first packet detection rule to a user plane function (UPF) network element of a first PDU session, the first PDU session corresponding to the first URSP rule; and the first packet detection rule instructs the UPF network element to obtain a first detection result, the first detection result indicates whether the target service flow transmitted by the target user equipment on the first PDU session is matched with the first packet detection rule.

Some embodiments of the present disclosure provide a URSP detection method, performed by a UPF network element of a first PDU session, the first PDU session corresponding to a first URSP rule, the first URSP rule corresponding to first PSI information, the first URSP rule being matched with a target service flow initiated by a target user equipment, and the method including: receiving a first packet detection rule that is of the first URSP rule and that is transmitted by a first core network element, the first PSI information instructs the first core network element to generate the first packet detection rule according to the first URSP rule obtained from the first PSI information; detecting whether a target service flow transmitted by a target user equipment on a first PDU session is matched with the first packet detection rule, to obtain a first detection result; and transmitting the first detection result to the first core network element.

Some embodiments of the present disclosure provide a URSP detection method, performed by an application function (AF) network element, the method including: receiving URSP rule execution notification information transmitted by a first core network element, the URSP rule execution notification information indicates an execution situation of a URSP rule in a UE or a group of UE(s), the URSP rule including a first URSP rule, the UE or the group of UE(s) including a target user equipment, and the first URSP rule being matched with a target service flow indicated by the target user equipment. The first PSI information instructs the first core network element to perform the following processes: obtaining first PSI information corresponding to the first URSP rule reported by the target user equipment, generating a first packet detection rule according to the first URSP rule obtained from the first PSI information, and configuring the first packet detection rule to a UPF network element of a first protocol data unit (PDU) session, the first PDU session corresponding to the first URSP rule; and the first packet detection rule instructs the UPF network element to obtain a first detection result, the first detection result indicates whether the target service flow transmitted by the target user equipment on the first PDU session is matched with the first packet detection rule. The first core network element is further configured to receive the first detection result, and generate the URSP rule execution notification information according to the first detection result.

Some embodiments of the present disclosure provide a first core network element, including: an obtaining unit, configured to obtain first PSI information corresponding to a first URSP rule reported by a target user equipment, the first URSP rule being matched with a target service flow initiated by the target user equipment; a generation unit, configured to generate a first packet detection rule according to the first URSP rule obtained from the first PSI information; a configuration unit, configured to configure the first packet detection rule to a UPF network element of a first PDU session, the first PDU session corresponding to the first URSP rule, and the first packet detection rule instructs the UPF network element to obtain a first detection result, the first detection result indicates whether the target service flow transmitted by the target user equipment on the first PDU session is matched with the first packet detection rule; and a receiving unit, configured to receive the first detection result transmitted by the UPF network element.

Some embodiments of the present disclosure provide a target user equipment, including: a determining unit, configured to determine, in response to initiating a target service flow, a first UE route selection policy (URSP) rule matched with the target service flow, and obtain first policy section identifier (PSI) information corresponding to the first URSP rule; and a reporting unit, configured to report the first PSI information to a first core network element, the first PSI information instructs the first core network element to generate a first packet detection rule according to the first URSP rule obtained from the first PSI information, and configure the first packet detection rule to a UPF network element of a first PDU session, the first PDU session corresponding to the first URSP rule; and the first packet detection rule instructs the UPF network element to obtain a first detection result, the first detection result indicates whether the target service flow transmitted by the target user equipment on the first PDU session is matched with the first packet detection rule, and transmitting the first detection result to the first core network element.

Some embodiments of the present disclosure provide a user plane function (UPF) network element, corresponding to a first protocol data unit (PDU) session, the first PDU session corresponding to a first UE route selection policy (URSP) rule, the first URSP rule corresponding to first PSI information, the first URSP rule being matched with a target service flow initiated by a target user equipment, and the UPF network element including: a receiving unit, configured to receive a first packet detection rule that is of the first URSP rule and that is transmitted by a first core network element, the first PSI information instructs the first core network element to perform the following processes: obtaining the first URSP rule according to the first PSI information, and generating the first packet detection rule according to the first URSP rule; a detection unit, configured to obtain a first detection result, the first detection result indicates whether the target service flow transmitted by the target user equipment on the first PDU session is matched with the first packet detection rule; and a transmission unit, configured to transmit the first detection result to the first core network element.

Some embodiments of the present disclosure provide an AF network element, including: a receiving unit, configured to receive URSP rule execution notification information transmitted by a first core network element, the URSP rule execution notification information indicates an execution situation of a URSP rule in a UE or a group of UE(s), the URSP rule including a first URSP rule, the UE or the group of UE(s) including a target user equipment, and the first URSP rule being matched with a target service flow indicated by the target user equipment. The first PSI information instructs the first core network element to perform the following processes: obtaining first PSI information corresponding to a first URSP rule reported by the target user equipment, obtaining the first URSP rule according to the first PSI information, generating a first packet detection rule according to the first URSP rule, and configuring the first packet detection rule to a user plane function (UPF) network element of a first PDU session, the first PDU session corresponding to the first URSP rule; and the first packet detection rule instructs the UPF network element to obtain a first detection result, the first detection result indicates whether the target service flow transmitted by the target user equipment on the first PDU session is matched with the first packet detection rule. The first detection result instructs the first core network element to generate the URSP rule execution notification information according to the first detection result.

Some embodiments of the present disclosure provide a computer-readable storage medium, storing a computer program, the computer program, when executed by a processor, implementing the URSP detection method according to the foregoing embodiments.

Some embodiments of the present disclosure provide a communication device, including: one or more processors; and a memory, configured to store one or more programs, the one or more programs, when executed by the one or more processors, enabling the communication device to implement the URSP detection method according to the foregoing embodiments.

In various embodiments, a first core network element obtains first PSI information reported by a target user equipment, to obtain a first URSP rule corresponding to the first PSI information, generate a first packet detection rule according to the first URSP rule, and configure the first packet detection rule to a UPF network element of a first PDU session, to use the first packet detection rule to instruct the UPF network element to detect whether the target service flow transmitted by the target user equipment on the first PDU session is matched with the first packet detection rule, and obtain a first detection result, so that the first core network element can determine, according to the first detection result, whether a UE correctly executes a URSP rule delivered by a network side, to take a corresponding processes measure in time to ensure stable communication of the UE.

Some embodiments of the present disclosure are now described more comprehensively with reference to the accompanying drawings. However, it will be understood that the various embodiments can be implemented in various forms, and are not constructed as a limitation to examples described herein. Instead, the implementations are provided to make the present disclosure more comprehensive and complete, and comprehensively convey the concept of the exemplary implementations to a person skilled in the art.

Various embodiments are applicable to various communication systems, such as a Global System for Mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, or a 5G system. For example, a communication system 100 used in an embodiment of the present disclosure is shown in FIG. 1. The communication system 100 may include a network device 110, and the network device 110 may be a device communicating with a terminal 120 (or referred to as a communication terminal or a terminal). The network device 110 may provide communication coverage for a specific geographical area, and may communicate with a terminal that is located within the covered area. In some embodiments, the network device 110 may be a base transceiver station (BTS) in a GSM system or a CDMA system, a NodeB (NB) in a WCDMA system, an evolved NodeB (eNB or eNodeB) in an LTE system, or a base station in a 5G communication system, or a wireless controller in a cloud radio access network (CRAN). in some embodiments, the network device may be a network side device in a mobile switching center, a relay station, an access point, an in-vehicle device, a wearable device, a hub, a switch, a bridge, a router, or a 5G network, or may be a network device or the like in a future evolved public land mobile network (PLMN).

The communication system 100 further includes at least one terminal 120 located within a coverage area of the network device 110. The "terminal" used herein includes, but is not limited to: being connected through a wired line, for example, through a public switched telephone network (PSTN), a digital subscriber line (DSL), a digital cable, or a direct cable; and/or another data connection/network; and/or being connected through a wireless interface, for example, through a cellular network, a wireless local area network (WLAN), a digital television network such as a DVB-H network, a satellite network, or an AM-FM broadcast transmitter; and/or an apparatus of another terminal that is configured to receive/send communication signals; and/or an Internet of Things (IoT) device. The terminal that is configured to communicate through the wireless interface may be referred to as a "wireless communication terminal", a "wireless terminal", or a "mobile terminal". An example of the mobile terminal includes, but is not limited to, a satellite or a cellular phone; a personal communication system (PCS) terminal that combines a cellular radio telephone, data processing, fax, and data communication capabilities; a PDA that may include a radio telephone, a beeper, Internet/Intranet access, a web browser, a memo pad, a calendar, and/or a global positioning system (GPS) receiver; and a conventional laptop and/or palmtop receiver or another electronic apparatus including a radio telephone transceiver. The terminal may be referred to as an access terminal, a user equipment, a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN, or the like. In some embodiments, the terminals 120 may perform device to device (D2D) communication with each other. In some embodiments, a 5G system or a 5G network may also be referred to as a new radio (NR) system or an NR network.

FIG. 1 illustratively shows one network device and two terminals. In some embodiments, the communication system 100 may include a plurality of network devices, and in a coverage area of each network device, another quantity of terminals may be included. This is not limited in the embodiments of the present disclosure. In some embodiments, the communication system 100 may further include another network entity such as a network policy control entity or a mobility management entity. This is not limited in the embodiments of the present disclosure. It may be understood that, in a network/system in the embodiments of the present disclosure, a device having a communication function can be referred to as a communication device. Using the communication system 100 shown in FIG. 1 as an example, the communication device may include a network device 110 and a terminal 120 that have a communication function. The network device 110 and the terminal 120 can be specific devices described above. Details are not described herein again. The communication device may further include other devices in the communication system 100, for example, other network entities such as a network policy control entity and a mobility management entity. This is not limited in the embodiments of the present disclosure.

It may be understood that, terms "system" and "network" in this specification are usually interchangeably used in this specification. The term "and/or" in this specification describes only an association relationship for describing associated objects and represents that three relationships may exist. For example, A and/or B may represent the following three cases: Only A exists, both A and B exist, and only B exists.

Figure 2:
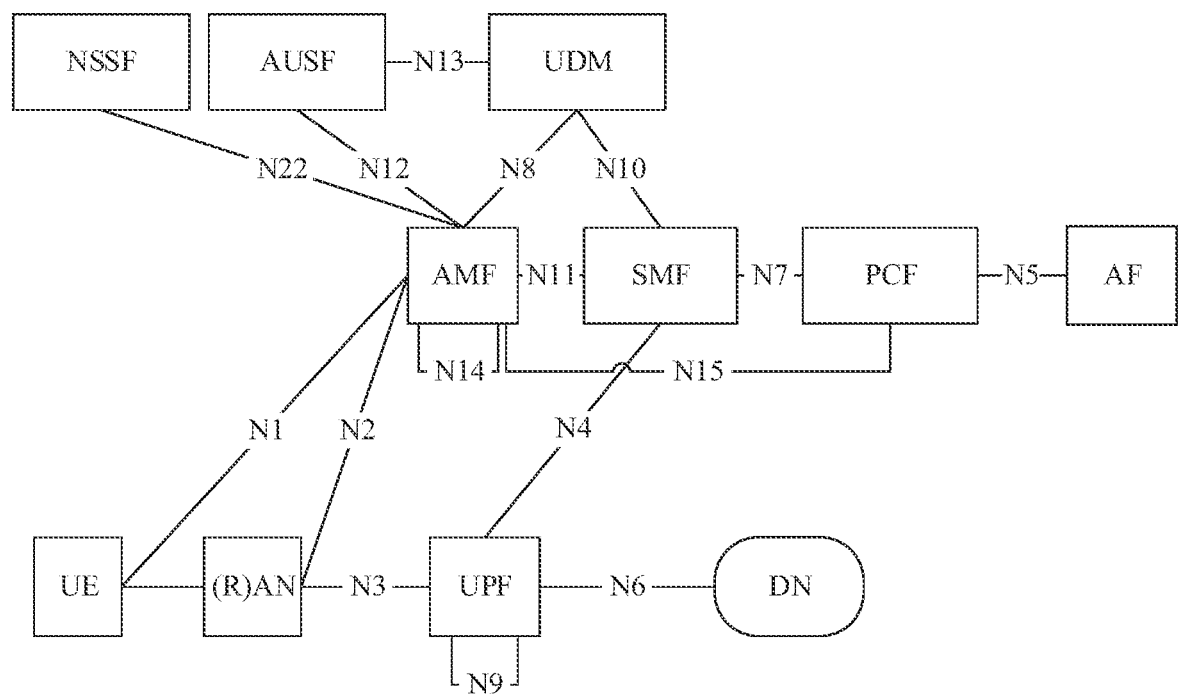
FIG. 2 is an architectural diagram of a system of a 5G network according to some embodiments.

FIG. 2 is an architectural diagram of a system of a 5G network according to an embodiment of the present disclosure. As shown in FIG. 2, devices involved in the 5G network include: a user equipment>a radio access network (RAN) and a UPF>a data network (DN), an access and mobility management function (AMF), a session management function (SMF), a policy control function (PCF) >AF>an authentication server function (AUSF), unified data management (UDM), and a network slice selection function (NSSF).

As shown in FIG. 2, network elements related to a policy are mainly the PCF, the AMF, the SMF, the RAN, and the UE. The SMF is mainly responsible for execution a policy related to a session, the AMF is mainly responsible for access and execution of a policy related to the UE policy, and policy delivery and update of the two network elements (the AMF and the SMF) are managed by the PCF.

For the UE policy, information related to the UE policy, including UE policy content, a UE policy identifier, and the like, may be monitored between the PCF and the UE through a container. In an uplink direction of the container, the container is sent to the AMF by using a non-access stratum (NAS) message, and the AMF continues to transparently transmit the container to the PCF without sensing or modifying the container. Conversely, in a downlink direction, the PCF transmits the container to the AMF, and the AMF further transparently transmits the container to the UE by using the NAS message. The UE policy includes a UPSP. The UPSP includes a plurality of policy rules (which is referred to as URSP rules). Each URSP rule includes a traffic descriptor/service descriptor and a group of route selection descriptors (RSDs).

The traffic descriptor in the URSP is used for describing a specific service. One traffic descriptor may correspond to one or more RSDs, and each RSD corresponds to an attribute of one PDU session. In other words, service data corresponding to the traffic descriptor may be transmitted in the PDU session corresponding to the RSD.

Related content of the UPSP in the related art is shown in FIG. 1 and FIG. 2.

TABLE 1

| | URSP rule | | | |
|---|---|---|---|---|
| Information name | Description | Category | PCF permitted to modify in a UE context | Scope |
| Rule precedence | The rule precedence determines the order of executing the URSP rule in the UE The rule precedence defines the Traffic descriptor components for the URSP rule. | Mandatory | Yes | UE context |
| Traffic descriptor | The Traffic descriptor consists of OSId and OSAppId(s). (Note 2) The Traffic descriptor consists of OSId and OSAppId(s). | Mandatory | | |
| Application descriptor | The Application descriptor consists of OSId and OSAppId(s). (Note 2) The Application descriptor consists of OSId and OSAppId(s). | Optional | Yes | UE context |
| IP descriptor | Destination IP 3 tuple(s) (IP address or IPv6 network prefix, port number, protocol ID of the protocol above IP). | Optional | Yes | UE context |
| Domain descriptor | FQDN(s) or a regular expression which are used as a domain name matching criteria. | Optional | Yes | UE context |
| Non-IP descriptors | Descriptor(s) for destination information of non-IP traffic. | Optional | Yes | UE context |

TABLE 1-continued

| Information name | Description | Category | PCF permitted to modify in a UE context | Scope |
|---|---|---|---|---|
| Data network name (DNN) | The Data network name (DNN) is matched against the DNN information provided by the application. | Optional | Yes | UE context |
| Connection capability | Connection capability is matched against the information provided by a UE application when it requests a network connection with certain capabilities. (Note 4) | Optional | Yes | UE context |
| List of route selection descriptors | A list of route selection descriptors The components of a Route Selection Descriptor are described in table 6.6.2.1-3. | Mandatory | | |

In Table 1, the rule precedence determines the order of using the URSP rule in the UE. The traffic descriptor may include one or more components: an application descriptor, an IP descriptor (a destination IP), a domain descriptor (a destination fully qualified domain name (FQDN)), a non-IP descriptor, a data network name (DNN), and a connection capability. The traffic descriptor is used by the UE for performing application matching. The URSP rule is applicable when each component in the traffic descriptor is matched with corresponding information from an application. The URSP rule is not applicable when any component in the traffic descriptor has the following cases: Corresponding information from an application is not available; and the corresponding information from the application is not matched with any value in the traffic descriptor.

TABLE 2

RSD

| Information name | Description | Category | PCF permitted to modify in URSP | Scope |
|---|---|---|---|---|
| Route selection descriptor precedence | Determines the order in which the route selection descriptors are to be applied. | Mandatory | Yes | UE context |
| Route selection components | Route selection components defines the route selection components. | Mandatory | | |
| SSC mode selection | One single value of SSC mode. | Optional | Yes | UE context |
| Network Slice Selection | Either a single value or a list of values of S-NSSAI(s). | Optional | Yes | UE context |
| DNN Selection | Either a single value or a list of values of DNN(s). | Optional | Yes | UE context |
| PDU session type selection | One single value of PDU Session Type. | Optional | Yes | UE context |
| Non-seamless offload indication | Indicates if the traffic of the matching application is to be offloaded to non-3GPP access outside of a PDU Session. | Optional | Yes | UE context |
| ProSe Layer-3 UE-to-Network Relay Offload indication | Indicates if the traffic of the matching application is to be sent via a ProSe Layer-3 UE-to-Network Relay outside of a PDU session. | Optional | Yes | UE context |
| Access type preference | Indicates the preferred Access Type (3GPP or non-3GPP or Multi-Access) when the UE establishes a PDU Session for the matching application. | Optional | Yes | UE context |
| PDU session pair ID | An indication shared by redundant PDU Sessions as descred in clause 5.33.2.1 of TS 23.501 [2]. | Optional | Yes | UE context |

TABLE 2-continued

| | | RSD | | |
|---|---|---|---|---|
| Information name | Description | Category | PCF permitted to modify in URSP | Scope |
| Robust security network (RSN) | The RSN as described in clause 5.33.2.1 of TS 23.501 [2]. | Optional | Yes | UE context |
| Route Selection Validation Criteria | This part defines the Route Validation Criteria components. | Optional | | |
| Time window | The time window when the matching traffic is allowed. The RSD is not considered to be valid if the current time is not in the time window. | Optional | Yes | UE context |
| Location criteria | The UE location where the matching traffic is allowed. The RSD rule is not considered to be valid if the UE location does not match the location criteria. | Optional | Yes | UE context |

In Table 2, the route selection descriptor precedence represents RSD precedence, and determines the order of using RSDs. When an RSD with higher precedence cannot be used, another RSD is used. The route selection components describe various network resources that can be used by an application and include one or more components, which may include: service and session continuity (SSC) mode selection (where the UE is configured to associate a matched application with an SSC mode), network slice selection (where the UE is configured to associate a matched application with S-NSSAI), DNN selection (where the UE is configured to associate a matched application with a DNN), protocol data unit (PDU) session type selection (PSTS, where the UE is configured to associate a matched application with a PDU session type), a non-seamless offload indication, an access type preference (which is also referred to as an access type priority, and indicates a preferred access type (3GPP or non-3GPP or multi-access if the UE needs to establish a PDU session for a matched application).

The route selection validation criteria are also referred to as route selection verification parameters, describe corresponding validation conditions, and include a time window (also referred to as a valid time window) and location criteria (also referred to as valid region parameters). If a current time point is not within the time window or a UE location is not matched with the location criteria, a corresponding RSD is considered to be invalid. The SSC mode, the single network slice selection assistance information (S-NSSAI), the PDU session type, and the DNN are all parameters related to a PDU session attribute. When a network delivers a user equipment policy (UE policy) to a terminal, the UE policy is divided into one or more sections for transmission, where each section corresponds to one identifier, that is, a policy section identifier (PSI). The PCF or the AMF transmits the UE policy to the UE, where the UE policy includes a UPSF policy. The UE policy is divided into one or more sections, and each section corresponds to one PSI and is sent to the UE, where the PSI is also referred to as a UE PSI (UPSI). In other words, a network side may divide the UE policy into a plurality of sections, and transmit the sections to the UE by using one or more NAS messages.

In a design of a 5th generation mobile communication technology (5G) system, the UE may trigger a UE policy reporting procedure. The reporting may be completed in an initial registration procedure, or may be completed in a mobility management procedure when the UE is handed over from an evolved packet system (EPS), also referred to as a 4G system to a 5G network. When the URSP is lost or invalid, the UE retrieves the URSP rule by using the initial registration procedure. The UE may include saved PSI information in this procedure, and the PCF receives the PSI information reported by the UE. The PCF may also obtain the PSI information from a unified data repository (UDR) function, compare whether the PSI information retrieved from the UDR is the same as the PSI information reported by the UE; and if the information is different, transmit URSP content corresponding to different PSIs to the UE, that is, transmit, to the UE, URSP content corresponding to the PSI information retrieved from the UDR; or skip returning UPSP content to the UE if the information is the same.

Each UE policy section is identified by a UPSI, where the UPSI includes the following two parts:
  a) a PLMN ID part, including a PLMN ID of a PLMN of the PCF that provides a UE policy; and
  b) UE policy section code (UPSC), including a unique value in a PLMN selected by the PCF.

In the related art, there is no solution for detecting whether the URSP rule is correctly executed by the UE. In view of a problem of executing the URSP rule by the UE, in the embodiments of the present disclosure, a solution for detecting execution of the URSP rule is provided, to determine whether the URSP rule delivered by the network side is correctly executed by the UE, so that when it is detected that the UE does not executes the URSP rule, a corresponding processing measure can be taken in time, for example, the UE is triggered to re-execute, to ensure normal communication of the UE.

Figure 3:
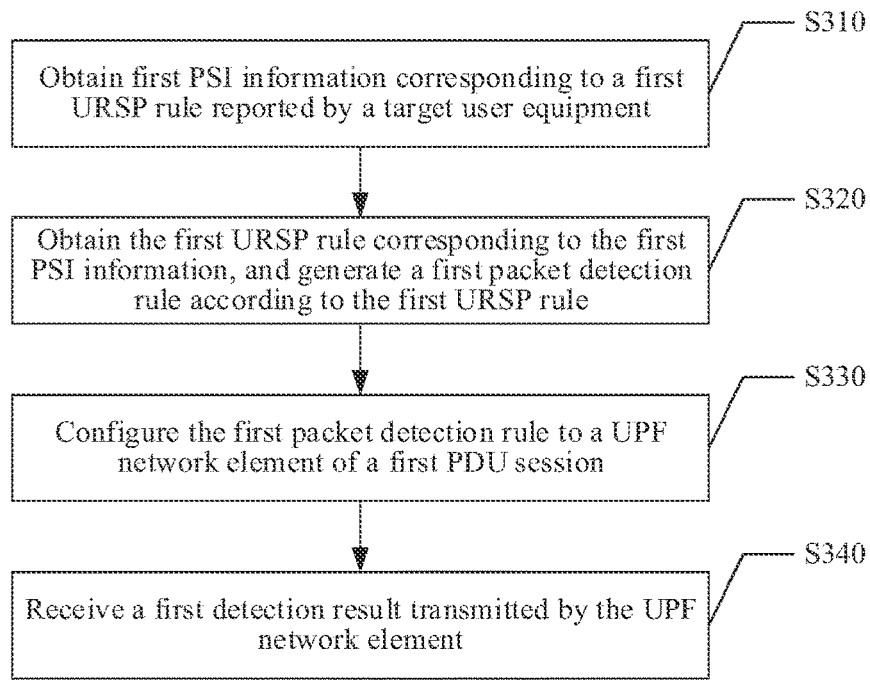
FIG. 3 is a flowchart of a URSP detection method according to some embodiments.

A URSP detection method provided in an embodiment of FIG. 3 may be performed by a first core network element. In some embodiments, the first core network element may be a PCF. However, embodiments are not limited thereto. As shown in FIG. 3, the method provided in some embodiments may include:

S310: Obtain first PSI information corresponding to a first URSP rule reported by a target user equipment.

The first URSP rule is matched with a target service flow initiated by the target user equipment. In some embodiments, the target user equipment may be any UE. When initiating a new service flow (which is referred to as a target service flow), the UE may determine which URSP rule is matched with the service flow. A URSP rule matched with the target service flow is referred to as a first URSP rule, where the first URSP rule may be any one of URSP rules, each URSP rule has corresponding PSI information, and PSI information corresponding to the first URSP rule is referred to as first PSI information.

The URSP may be used for enabling the UE to map a specific service flow to a corresponding data transmission session. For example, the PCF may generate a plurality of URSP rules in a core network, and each URSP rule may include a traffic descriptor and an RSD. When an application on the UE is started, a traffic descriptor in the URSP rule generated by the core network may be matched according to a traffic feature of the application started by the UE, to determine a corresponding URSP. Each URSP rule may include one or more RSDs, and corresponding RSD precedence may be configured for different RSDs in each URSP rule according to a service requirement and a service type. After a corresponding UPSP is matched, the UE may select a corresponding RSD according to RSD precedence of each generated RSD, and transmit data of the application (which is referred to as service data or application data, and is referred to as a target service flow herein) on a data transmission session corresponding to the RSD.

In some embodiments, the obtaining first PSI information corresponding to a first URSP rule reported by a target user equipment may include: when the first PDU session has been established in a process of initiating the target service flow by the target user equipment, obtaining the first PSI information from a second core network element in a modification procedure of the first PDU session triggered by the target user equipment. In some embodiments, the second core network element may be configured to receive the first PSI information from a third core network element. The third core network element may be configured to receive the first PSI information from the target user equipment.

In some embodiments, the second core network element may be an SMF. However, embodiments are not limited thereto. The third core network element may be an AMF. However, embodiments are not limited thereto.

In some embodiments, the obtaining first PSI information corresponding to a first URSP rule reported by a target user equipment may include: when the first PDU session has not been established in a process of initiating the target service flow by the target user equipment, obtaining the first PSI information from a second core network element in an establishment procedure of the first PDU session triggered by the target user equipment. In some embodiments, the second core network element may be configured to receive the first PSI information from a third core network element. The third core network element may be configured to receive the first PSI information from the target user equipment.

In Some embodiments of the present disclosure, when initiating a new target service flow, the UE may determine which URSP rule is matched with the target service flow; and if the matched URSP rule (the first URSP rule) has been used for establishing a PDU session (a first PDU session), transmit the target service flow on the PDU session; or if the matched URSP rule has not been used for establishing a PDU session, initiate a procedure of establishing a new PDU session, which is referred to as a procedure of establishing the first PDU session.

(1) If the matched first URSP rule has been used for establishing a first PDU session, the UE triggers a procedure of modifying the first PDU session, and transmits an NAS message to a network (where the NAS message is sent to the SM through a base station, and is finally sent to the PCF), where the message includes first PSI information of the first URSP rule matched with the newly added target service flow.

(2) If the matched first URSP rule has not been used for establishing a first PDU session, the UE initiates a procedure of establishing a first PDU session, and transmits first PSI information of the first URSP rule matched with the target service flow to a network (where the first PSI information is sent to the AMF through a base station, and is finally sent to the PCF).

S320: Obtain the first URSP rule corresponding to the first PSI information, and generate a first packet detection rule acquire the first URSP rule.

In some embodiments, the first packet detection rule may include at least one of a first IP descriptor, a first domain descriptor, and a first non-IP descriptor. In some embodiments, after obtaining the reported first PSI information, the PCF may obtain a first URSP rule corresponding to the first PSI information, where the first URSP rule includes rule precedence and a traffic descriptor, and may further include one or more of an application descriptor (which is also referred to as a first application descriptor), an IP descriptor (which is also referred to as a first domain descriptor), a domain descriptor (which is also referred to as a first domain descriptor), a non-IP descriptor (which is referred to as a first non-IP descriptor), a DNN, a connection capability, a list of route selection descriptors, and each parameter of each RSD.

After obtaining the first URSP rule, the PCF may select some or all parameters in content of the first URSP rule to generate a corresponding first packet detection rule (PDR). For example, if the first URSP rule includes an IP descriptor, the first PDR may include the IP descriptor. If the first URSP rule includes a domain descriptor, the first PDR may include the domain descriptor. If the first URSP rule includes a non-IP descriptor, the first PDR may include the non-IP descriptor. In another example, if the first URSP rule includes an application descriptor, the first PDR may include the application descriptor. If the first URSP rule includes a DNN, the first PDR may include the DNN. In another example, if the first URSP rule includes the IP descriptor, the domain descriptor, the non-IP descriptor, and the DNN, the first PDR includes the IP descriptor and the domain descriptor; or the first PDR includes the IP descriptor, the domain descriptor, the application descriptor, and the DNN; or the first PDR includes the IP descriptor, the domain descriptor, the application descriptor, and the like. The first PDR may be stored on the PCF before the first PDU session is established, or may be obtained by the PCF after receiving the first PSI information.

S330: Configure the first packet detection rule to a user plane function (UPF) network element of a first protocol data unit (PDU) session.

The first PDU session corresponds to the first URSP rule, where the first packet detection rule may instruct the UPF network element to detect whether the target service flow transmitted by the target user equipment on the first PDU session is matched with the first packet detection rule, to obtain a first detection result.

In some embodiments, the configuring the first packet detection rule to a user plane function (UPF) network element of a first protocol data unit (PDU) session may include: transmitting the first packet detection rule to the second core network element. The second core network element may be configured to transmit the first packet detection rule to the UPF network element. In some embodiments, the second core network element may be an SMF. However, embodiments are not limited thereto. For example, if the first PDU session has been established, the PCF transmits the first packet detection rule to the SMF, and the SMF transmits the first PDR to the UPF of the first PDU session. The target UE transmits the target service flow on the first PDU session, and the UP may detect whether the target service flow is matched with the first PDR. In another example, if the first PDU session has not been established, the PCF transmits the first packet detection rule to the SMF, and the SMF transmits the first PDR to the UPF of the first PDU session. After the first PDU session has been established, the target UE transmits the target service flow on the first PDU session, and the UP may detect whether the target service flow is matched with the first PDR, and obtain a first detection result. The UPF may send the first detection result to the SMF, and indicates whether a target service flow on the first PDU session is matched with the first PDR.

S340: Receive the first detection result transmitted by the UPF network element.

In some embodiments, the receiving the first detection result transmitted by the UPF network element may include: receiving the first detection result from the second core network element. The second core network element may be configured to receive the first detection result from the UPF network element.

In some embodiments, the receiving the first detection result transmitted by the UPF network element may include: receiving the first detection result when the first detection result indicates that the target service flow is matched with the first packet detection rule; receiving the first detection result when the first detection result indicates that the target service flow is not matched with the first packet detection rule; or receiving the first detection result when the first detection result indicates that the target service flow is matched with or not matched with the first packet detection rule.

In some embodiments, the UPF may send the first detection result to the SMF, and indicates whether a target service flow on the first PDU session is matched with the first PDR. The SMF reports the first detection result to the PCF. In a first instance, the first detection result is reported to the PCF when it is detected that the target service flow on the first PDU session is not matched with the first PDR, and if only a mismatching case needs to be uploaded and a matching case does not to be loaded, a data transmission volume of the SMF and the PCF may be reduced, and occupied storage space may be reduced. In a second instance, the first detection is reported to the PCF regardless of whether the target service flow on the first PDU session is matched or not matched with the first PDR, and the SMF simultaneously reports matching and mismatching cases to the PCF, which facilitates the PCF in directly collecting statistics on sums of matching and mismatching cases and respective proportions according to the received data, and increasing a calculation rate. In a third instance, the first detection result is reported to the PCF when it is detected that the target service flow on the first PDU session is matched with the first PDR, and if only a matching case needs to be uploaded and a mismatching case does not to be loaded, a data transmission volume of the SMF and the PCF may be reduced, and occupied storage space may be reduced. This is not limited in the embodiments of the present disclosure.

In some embodiments, the first packet detection rule may include a detection frequency, where the detection frequency may instruct the UPF network element to regularly detect a packet in the target service flow according to the detection frequency. In some embodiments, the detection frequency may further be added in the first PDR. The UPF detects a packet on the first PDU session once at a fixed interval according to the detection frequency. This is because the UE is incredible by fault, may perform an incorrect operation and transmit data of a plurality of service flows through the first PDU session. In view of this, when the UPF performs regular detection according to the detection frequency, first detection result for some packets (which are packets in the target service flow) may be matched, and first detection results for some packets (which are packets of other service flows put into the target service flow through misoperation.

Figure 4:
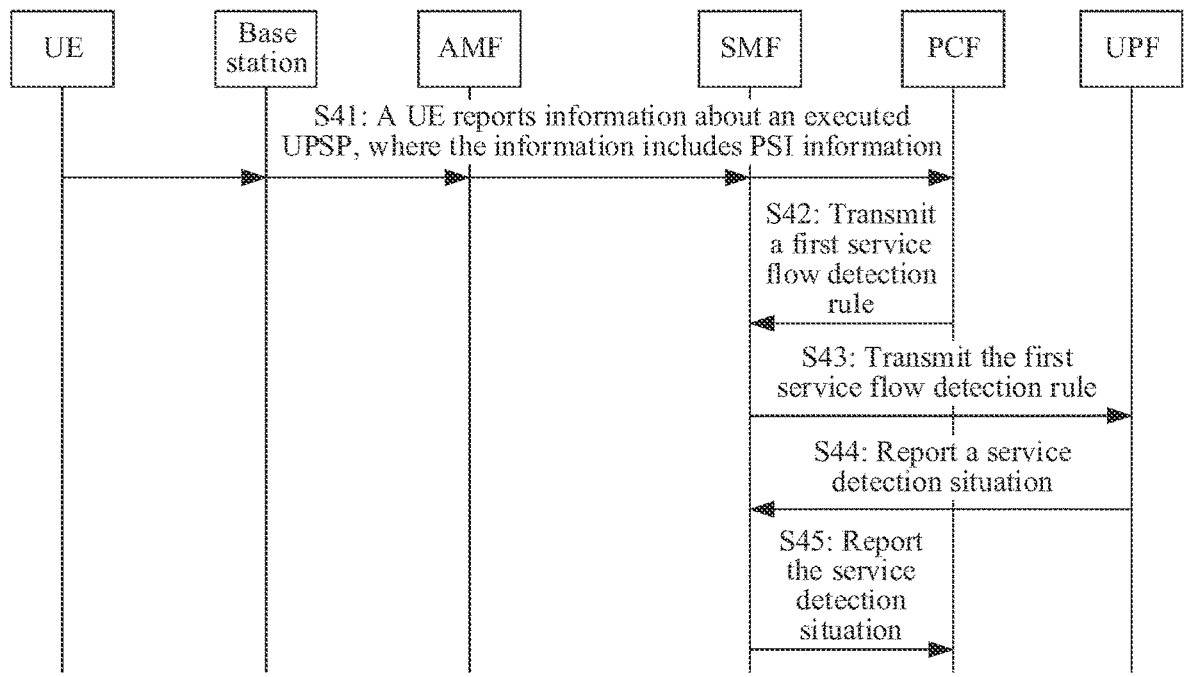
FIG. 4 is a schematic diagram of interaction of a URSP detection method according to some embodiments.

As shown in FIG. 4, the method provided in some embodiments may include the following steps.

S41: A UE reports information about an executed UPSP, where the information includes PSI information The UE in S41 may be any UE and is referred to as a target UE. The information about the executed UPSP reported by the UE is information related to a first URSP rule matched with a target service flow newly initiated by the UE, where included PSI information is referred to as first PSI information, and a corresponding PDU session is referred to as a first PDU session.

In S41, the corresponding first PSI information may be transmitted to the PCF in a PDU session establishment procedure or a PDU session update procedure, and the UE may report the first PSI information to a PCF sequentially through a base station, an AMF, and an SMF.

S42: A PCF transmits a first packet detection rule to an SMF.

The PCF transmits a corresponding packet detection rule, referred to as a first packet detection rule, to the SMF according to the received first PSI information.

S43: The SMF forwards the first packet detection rule to a UPF of a first PDU session.

After receiving the first packet detection rule, the SMF forwards the first packet detection rule to a UPF of the first PDU session.

S44: The UPF reports a service detection situation to the SMF.

After receiving the first packet detection rule, the UPF of the first PDU session detects, according to the first packet detection rule, whether a target service flow transmitted by the UE on the first PDU session is matched with the first packet detection rule, obtains a first detection result, and uses the first detection result as a service detection situation for reporting to the SMF.

S45: The SMF reports the service detection situation to the PCF.

After receiving the service detection situation, the SMF transmits the service detection situation to the PCF.

In some embodiments, the method may further include: generating URSP rule execution notification information according to the first detection result, where the URSP rule execution notification information is used for indicating an execution situation of a URSP rule in a UE or a group of UE(s), the URSP rule includes the first URSP rule, and the UE or the group of UE(s) includes the target user equipment; and transmitting the URSP rule execution notification information to an application function (AF) network element.

In some embodiments, the method may further include: receiving a URSP execution situation subscription request message transmitted by the AF network element, where the URSP execution situation subscription request message includes information about the URSP rule and information about the AF network element; authenticating the URSP execution situation subscription request message according to the information about the AF network element, and generating a URSP execution situation subscription response message according to an authentication result; and transmitting a URSP execution request subscription response message to the AF network element.

In some embodiments, the method may further include: receiving URSP rule configuration information transmitted by the AF network element; generating the URSP rule with reference to the URSP rule configuration information; and transmitting information about the URSP rule to the AF network element.

In some embodiments, the AF may affect the PCF to generate a URSP rule, for example, a process in which the AF affects the URSP rule is defined. The AF may provide parameter information to a network element, such as an NEF, in a network, including but not limited to:

1) Service description indicates an AF identifier
2) Service parameters
3) A specific UE, or a group of UE(s) or any UE that the AF request may be associated with
4) Subscription to events In some embodiments, URSP rule configuration information is carried in the service parameters, and the URSP rule configuration information may include configuration information that the AF hopes to affect any one or more of parameters in Table 1 and Table 2 above. After receiving the URSP rule configuration information from the AF or the NEF, the PCF may determine, according to a decision of the PCF, whether to receive the URSP rule configuration information; and if determining to receive, generate a URSP rule with reference to the URSP rule configuration information; or if determining not to receive, skip generating a URSP rule with reference to the URSP rule configuration information.

Figure 6:
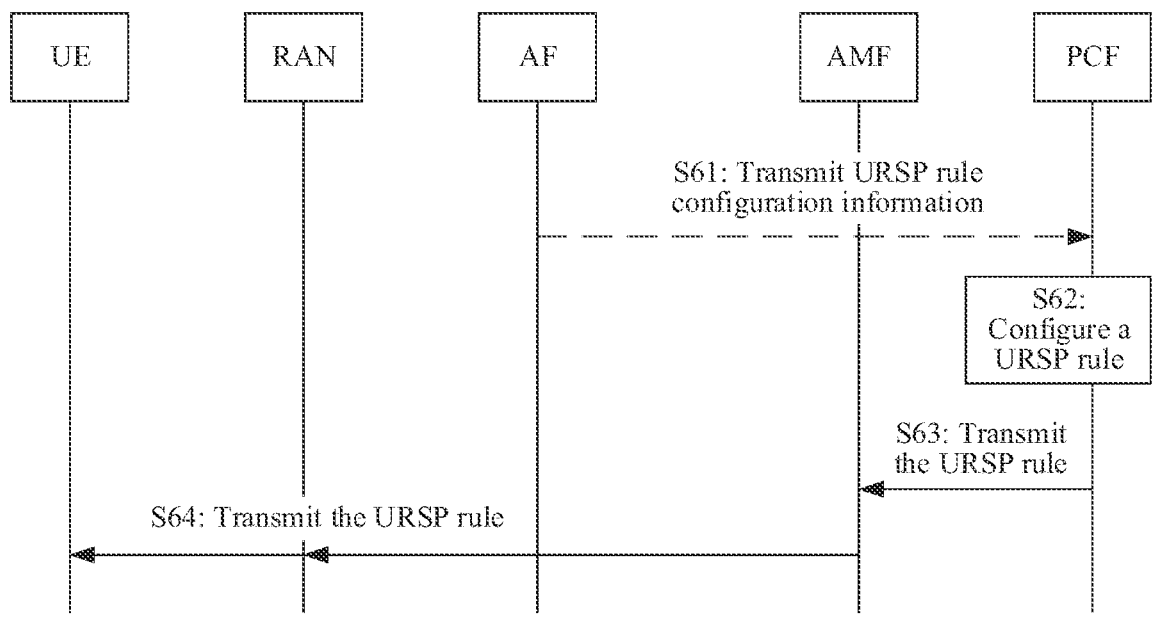
FIG. 6 is a schematic diagram of interaction of a URSP detection method according to some embodiments.

For example, as shown in FIG. 6, the method provided in some embodiments may include the following steps.

S61: The AF transmits URSP rule configuration information to the PCF.

S62: The PCF configures a URSP rule.

After receiving the URSP rule configuration information from the AF, the PCF determines, with reference to the URSP rule configuration information, to generate the URSP rule. It may be understood that, the URSP rule configuration information may be included in an existing parameter in an existing message, or may be included in a newly-added parameter of an existing parameter, or may be transmitted through a newly-added parameter. However, embodiments are not limited thereto. S61 may be a default, that is, the PCF may in some embodiments directly configure the URSP rule.

S63: The PCF transmits the generated URSP rule to the AMF.

The PCF may put the configured URSP rule into a container for sending to the AMF. However, embodiments are not limited thereto.

S64: After receiving a UPSP, the AMF sends the UPSP to the UE through a RAN.

In some embodiments, the AMF may directly forward, to the UE by using an NAS message, a container in which the URSP rule is encapsulated. However, embodiments are not limited thereto.

Figure 7:
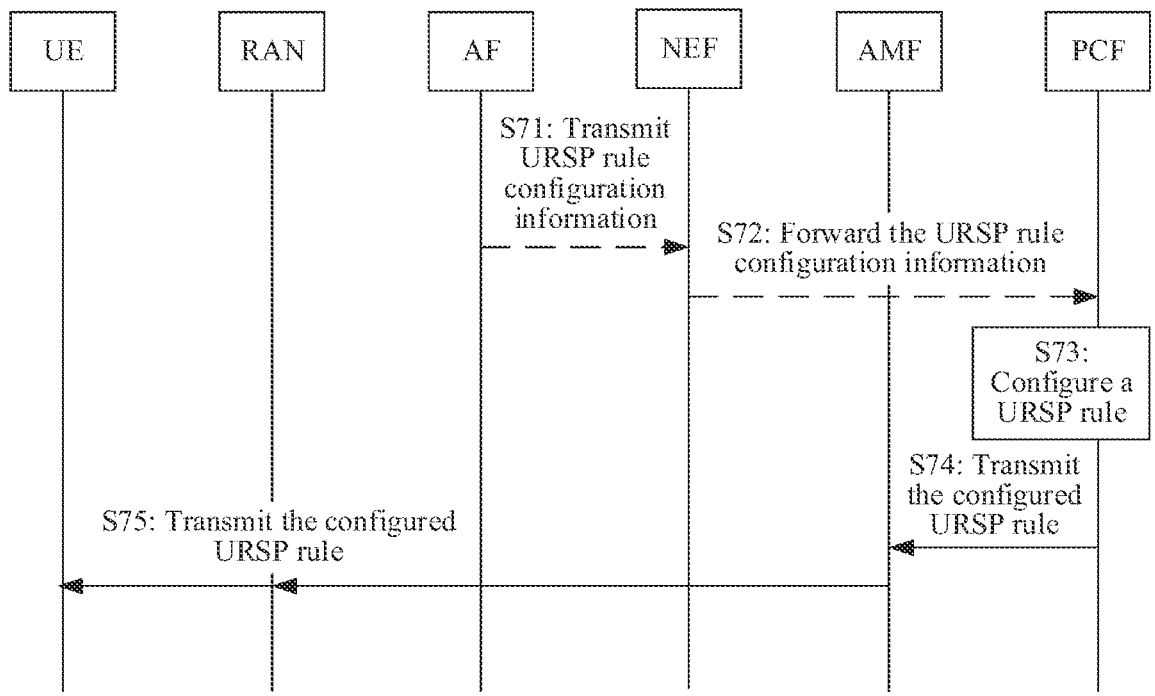
FIG. 7 is a schematic diagram of interaction of a URSP detection method according to some embodiments.

In another example, as shown in FIG. 7, the method may include:

S71: The AF sends URSP rule configuration information to the NEF.

S72: After receiving the URSP rule configuration information from the UE, the NEF forwards the URSP rule configuration information to the PCF.

S73: The PCF configures a URSP rule.

After receiving the URSP rule configuration information from the NEF, the PCF configures, with reference to the URSP rule configuration information, to generate the URSP rule.

S71 and S72 may be a default, for example, the PCF may in some embodiments directly configure the URSP rule.

S74: The PCF transmits the configured URSP rule to the AMF.

S75: The AMF transmits the configured URSP rule to the UE through the RAN.

After receiving the configured URSP rule, the AMF forwards the configured URSP rule to the UE through the RAN. For example, assuming that the PCF receives the URSP rule configuration information from the AF or the NEF, to configure to generate a URSP rule, and then transmit, to the AF through the RAN, the generated URSP rule and corresponding information, for example, an identity (ID) of the URSP rule and/or PSI information.

Figure 5:
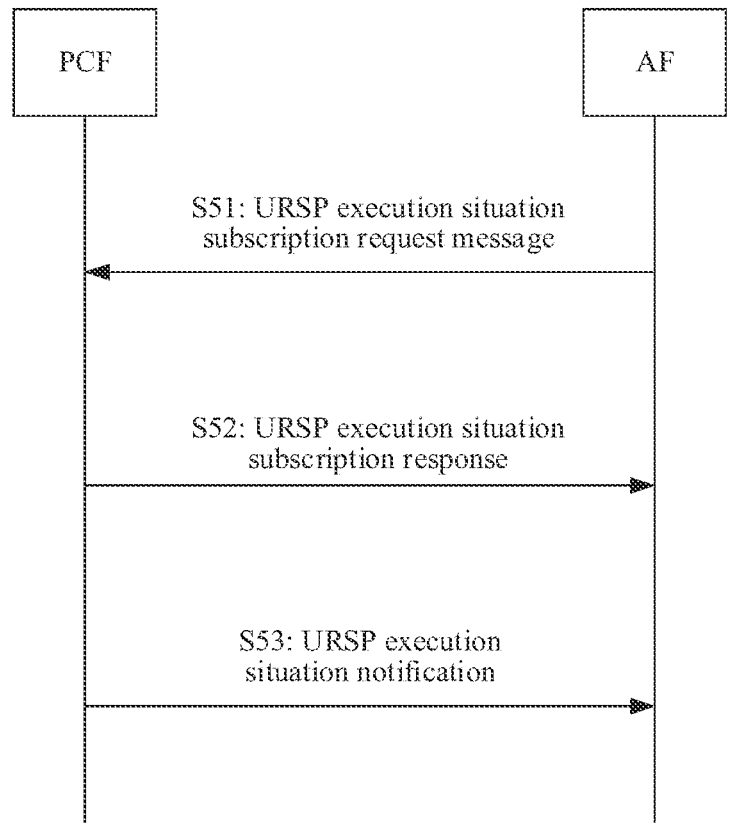
FIG. 5 is a schematic diagram of interaction of a URSP detection method according to some embodiments.

As shown in FIG. 5, the method provided in some embodiments may include the following steps.

S51: The AF transmits a URSP execution situation subscription request message to the PCF.

After receiving information about the URSP rule returned by the PCF, if the AF hopes to know whether the URSP rule is correctly executed after being delivered to the UE or the group of UE(s), the AF may transmit URSP execution situation subscription request message to the PCF, where the URSP execution situation subscription request message may include at least information about the URSP rule that the AF wishes to know about its execution status in the UE or the group of UE(s), and information about the AF.

S52: PCF execution situation subscription response.

After receiving the URSP execution situation subscription request message, the PCF authenticates the URSP execution situation subscription request message according to the information about the AF carried in the URSP execution situation subscription request message, and determines whether the AF can subscribe to the information (that is, an execution situation of whether the URSP rule can be subscribed on the UE or the group of UE(s)). If authentication is successful, a subscription success message is sent to the AF a URSP execution situation subscription response message; and if authentication is not successful, a subscription failure message is sent to the AF as a URSP execution situation subscription response message.

S53: URSP execution situation notification

If the PCF receives a URSP rule execution situation subscription request transmitted by the AF, when receiving a URSP service execution situation (for example, the first detection result) reported by the SMF, the PCF may send a message to the AF according to the received service execution situation, where the message indicates a situation of executing the URSP rule by the UE or the group of UE(s), which is referred to as URSP execution situation notification information, and the URSP execution situation notification information may include ID information of the UE, ID information of the URSP rule, and/or PSI information.

In some embodiments, the URSP execution situation notification information includes an indication of an execution situation, and the indication of the execution situation may be any one or more of the following: a detection result of a URSP rule on a UE, for example, the first detection result of the first URSP rule on the target UE, where the URSP rule is included in the URSP execution situation subscription request message transmitted by the AF to the PCF; a detection result of a URSP rule on all UEs or the group of UE(s) to which the URSP rule is delivered, where the URSP rule is included in the URSP execution situation subscription request message transmitted by the AF to the PCF; a detection result that is of each URSP rule on each UE or group of UE(s) to which the URSP rule is delivered and that is in the URSP execution situation subscription request message transmitted by the AF to the PCF; and statistical information generated according to the detection result that is of each URSP rule on each UE or group of UE(s) to which the URSP rule is delivered and that is in the URSP execution situation subscription request message transmitted by the AF to the PCF.

The statistical information generated according to the detection result that is of each URSP rule on each UE or group of UE(s) to which the URSP rule is delivered and that is in the URSP execution situation subscription request message transmitted by the AF to the PCF may include, for example, one or more of the following information: a percentage of UEs whose detection results are being matched within a period of time in UEs to which the URSP rule is delivered, for example, assuming that a URSP rule is delivered to 100 UEs, detection results of 50 UEs in 100 UEs are being matched, and the obtained percentage is 50%; and a percentage of UEs whose detection results are being not matched within a period of time in UEs to which the URSP rule is delivered.

The indication of the execution situation included in the URSP execution situation notification information may vary according to different content carried in the URSP execution situation subscription request message transmitted by the AF to the PCF, for example, if the URSP execution situation subscription request message returns statistical information, the returned URSP execution situation notification information includes the statistical information.

In some embodiments, the method may further include: transmitting blocking indication information corresponding to the first packet detection rule, where the blocking indication information may be used for instructing the UPF network element to block a target service flow that is not matched with the first packet detection rule. Specifically, when transmitting a first PDR to the UPF, the SMF may instruct the UPF to block a target service flow that does not comply with the first PDR. The UPF detects a target service flow of a first PDU session, and when the target service flow does not comply with the first PDR, may report the information to the SMF, and block the target service flow according to an instruction of the SMF.

some embodiments, the method may further include: when the first detection result indicates that the target service flow is not matched with the first packet detection rule, generating a URSP rule matching error message, where the URSP rule matching error message may be used for indicating that the first URSP rule matched by the target user equipment on the first PDU session is incorrect; and transmitting the URSP rule matching error message to the target user equipment. In some embodiments, when receiving a message that is transmitted by the SMF and includes the first detection result that the target service flow does not comply with the first PDR, the PCF may send the URSP rule matching error message to the target UE, where the URSP rule matching error message may be used for indicating that the target UE has error matching on the first URSP rule on the first PDU session, and the URSP rule matching error message may include an ID of the first PDU session and first PSI information of the first URSP rule. When receiving the URSP rule matching error message, the target UE may re-match the target service flow on the first PDU session and another URSP rule until finding a suitable URSP rule. The found another suitable URSP rule may be referred to as a second URSP rule. For a case in which the target service flow of the target UE is transmitted by using a second PDU session of the second URSP rule, reference may be made to the description of transmitting the target service flow by using the first PDU session of the first URSP rule.

The UE associates application data to a corresponding PDU session based on a received URSP for transmission. A mechanism is as follows: When an application layer transmits data, the UE uses a URSP rule in the URSP to view whether a feature of the application data is matched with a traffic descriptor of a rule in the URSP rule. For an order of viewing is determined according to rule precedence in the URSP rule. In other words, the UE checks sequentially a matching situation based on a precedence order. When the traffic descriptor of a URSP rule is matched, an RSD list under the URSP rule is used to bind the PDU session. When a URSP rule is matched, the UE searches for a suitable PDU session according to route selection descriptor precedence. An RSD with higher precedence is used first. If a parameter in the RSD includes one or more values, the UE selects a combination of parameters to determine whether the PDU session exists:

1) if exists, the application data is bound to the session for transmission; and
2) If not exists, the UE triggers establishment of the PDU session, and the UE reports an attribute parameter of the PDU session in an establishment request message. Further,
2.1) if the session is successfully established, the UE binds the application data to the session for transmission; and
2.2) if the session is not successfully established, the UE determines again whether the PDU session exists based on another combination of parameters in the RSD or by using a combination of parameters in an RSD of lower precedence (cyclically performing step 1).

According to the method provided in some embodiments, an execution result for the URSP rule may be detected, and the execution result may be fed back to an AF on an application side.

Figure 8:
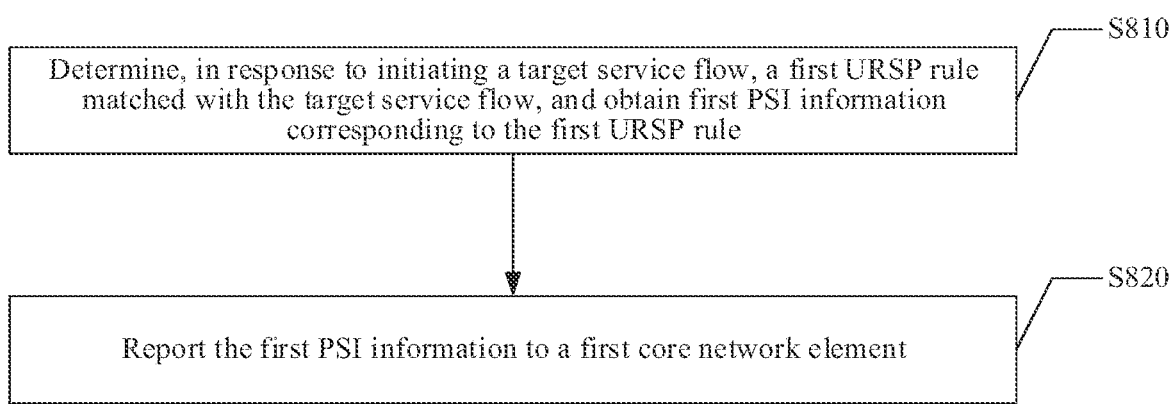
FIG. 8 is a flowchart of a URSP detection method according to some embodiments.

A URSP detection method provided in an embodiment of FIG. 8 may be performed by a target user equipment.

As shown in FIG. 8, the method provided in some embodiments may include the following steps.

S810: Determine, in response to initiating a target service flow, a first URSP rule matched with the target service flow, and obtain first PSI information corresponding to the first URSP rule.

S820: Report the first PSI information to a first core network element. The first PSI information may be used for instructing the first core network element to generate a first packet detection rule according to the first URSP rule obtained from the first PSI information, and configure the first packet detection rule to a UPF network element of a first protocol data unit (PDU) session, the first PDU session corresponding to the first URSP rule. The first packet detection rule may be used for instructing the UPF network element to detect whether the target service flow transmitted by the target user equipment on the first PDU session is matched with the first packet detection rule, obtain a first detection result, and transmit the first detection result to the first core network element.

In some embodiments, the reporting the first PSI information to a first core network element may include: triggering a procedure of modifying the first PDU session if the first PDU session has been established in response to initiating the target service flow; and transmitting the first PSI information to a third core network element in the procedure of modifying the first PDU session. The third core network element may be configured to transmit the first PSI information to the second core network element. The second core network element may be configured to transmit the first PSI information to the first core network element.

In some embodiments, the reporting the first PSI information to a first core network element may include: triggering a procedure of establishing the first PDU session if the first PDU session has not been established in response to initiating the target service flow; and transmitting the first PSI information to a third core network element in the procedure of establishing the first PDU session. The third core network element may be configured to transmit the first PSI information to the second core network element. The second core network element may be configured to transmit the first PSI information to the first core network element. After the first PDU session is established, the target service flow is transmitted on the first PDU session.

In some embodiments, the method may further include: receiving a URSP rule matching error message from the first core network element, where the URSP rule matching error message may be used for indicating that the first URSP rule matched by the target user equipment on the first PDU session is incorrect; re-matching a second URSP rule for the target service flow according to the URSP rule matching error message; and transmitting the target service flow on a second PDU session corresponding to the second URSP rule.

The first core network element may be further configured to generate the URSP rule matching error message when the first detection result indicates that the target service flow is not matched with the first packet detection rule. For other content in the embodiment of FIG. 8, reference may be made to other embodiments described above.

Figure 9:
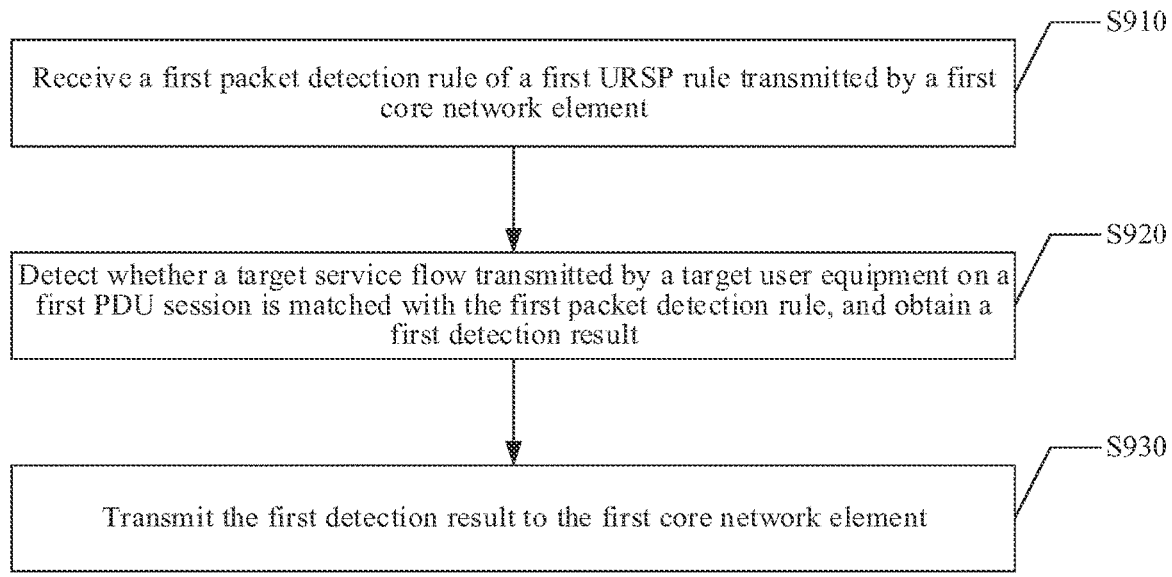
FIG. 9 is a flowchart of a URSP detection method according to some embodiments.

A URSP detection method provided in an embodiment of FIG. 9 may be performed by a user plane function (UPF) network element of a first protocol data unit (PDU) session, the first PDU session corresponds to a first URSP rule, the first URSP rule corresponds to first PSI information, and the first URSP rule is matched with a target service flow initiated by a target user equipment.

As shown in FIG. 9, the method provided in some embodiments may include the following steps.

S910: Receive a first packet detection rule that is of the first URSP rule and that is transmitted by a first core network element, where the first PSI information may be used for instructing the first core network element to generate the first packet detection rule according to the first URSP rule obtained from the first PSI information.

S920: Detect whether a target service flow transmitted by a target user equipment on a first PDU session is matched with the first packet detection rule, to obtain a first detection result.

S930: Transmit the first detection result to the first core network element.

In some embodiments, the receiving a first packet detection rule that is of the first URSP rule and that is transmitted by a first core network element may include: receiving the first packet detection rule from a second core network element. The second core network element may be configured to receive the first packet detection rule from the first core network element.

In some embodiments, the transmitting the first detection result to the first core network element may include: transmitting the first detection result to the second core network element. The second core network element may be configured to transmit the first detection result to the first core network element.

In some embodiments, the first packet detection rule may include at least one of a first IP descriptor, a first domain descriptor, and a first non-IP descriptor. The detecting whether the target service flow transmitted by the target user equipment on the first PDU session is matched with the first packet detection rule, to obtain a first detection result may include: detecting whether the target service flow is matched with the first packet detection rule. If not matched, the obtained first detection result is that the target service flow is not matched with the first packet detection rule; or if matched, the obtained first detection result is that the target service flow is matched with the first packet detection rule.

In some embodiments, the first packet detection rule may include a detection frequency. The detecting whether the target service flow transmitted by the target user equipment on the first PDU session is matched with the first packet detection rule, to obtain a first detection result may include: regularly detecting, according to the detection frequency, whether a packet in the target service flow is matched with the first packet detection rule, and obtaining the first detection result.

In some embodiments, the method may further include: receiving blocking indication information corresponding to the first packet detection rule, where the blocking indication information may be used for instructing the UPF network element to block a target service flow that is not matched with the first packet detection rule. The method may further include: blocking the target service flow if the first detection result is that the target service flow is not matched with the first packet detection rule.

For other content in the embodiment of FIG. 9, reference may be made to other embodiments described above.

Figure 10:
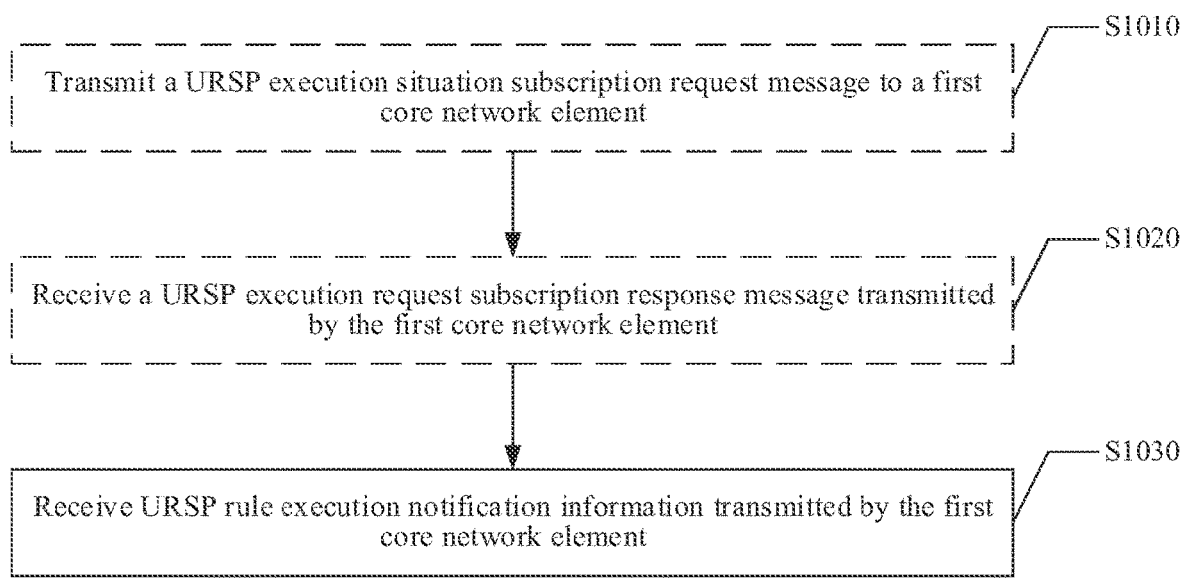
FIG. 10 is a flowchart of a URSP detection method according to some embodiments.

A URSP detection method provided in an embodiment of FIG. 10 may be performed by an application function (AF) network element. However, embodiments are not limited thereto.

As shown in FIG. 10, the method provided in some embodiments may include the following steps.

S1030: Receive URSP rule execution notification information transmitted by the first core network element.

URSP rule execution notification information transmitted by the first core network element is received, where the URSP rule execution notification information may be used for indicating an execution situation of a URSP rule in a UE or a group of UE(s), the URSP rule may include a first URSP rule, the UE or the group of UE(s) including a target user equipment, and the first URSP rule may be matched with a target service flow indicated by the target user equipment.

The first core network element may be configured to obtain first PSI information corresponding to the first URSP rule reported by the target user equipment, generate a first packet detection rule according to the first URSP rule obtained from the first PSI information, and configure the first packet detection rule to a user plane function (UPF) network element of a first protocol data unit (PDU) session, the first PDU session corresponding to the first URSP rule. The first packet detection rule may be used for instructing the UPF network element to detect whether the target service flow transmitted by the target user equipment on the first PDU session is matched with the first packet detection rule, to obtain a first detection result. The first detection result may be used for instructing the first core network element to generate the URSP rule execution notification information according to the received first detection result.

Still referring to FIG. 10, in some embodiments, before S1030, the method may further include:

S1010: Transmit a URSP execution situation subscription request message to a first core network element.

A URSP execution situation subscription request message is transmitted to the first core network element, where the URSP execution situation subscription request message includes information about the URSP rule and information about the AF network element. The URSP execution situation subscription request message may be used for instructing the first core network element to authenticate the URSP execution situation subscription request message according to the information about the AF network element, and generating a URSP execution situation subscription response according to an authentication result.

S1020: Receive a URSP execution request subscription response message transmitted by the first core network element.

In some embodiments, the method may further include: transmitting URSP rule configuration information to the first core network element. The URSP rule configuration information may be used for instructing the first core network element to generate the URSP rule with reference to the URSP rule configuration information, and receive the information about the URSP rule transmitted by the first core network element. In some embodiments, the first core network element may be further configured to generate the URSP rule with reference to the URSP rule configuration information; and receive the information about the URSP rule transmitted by the first core network element.

For other content in the embodiment of FIG. 10, reference may be made to other embodiments described above.

Figure 11:
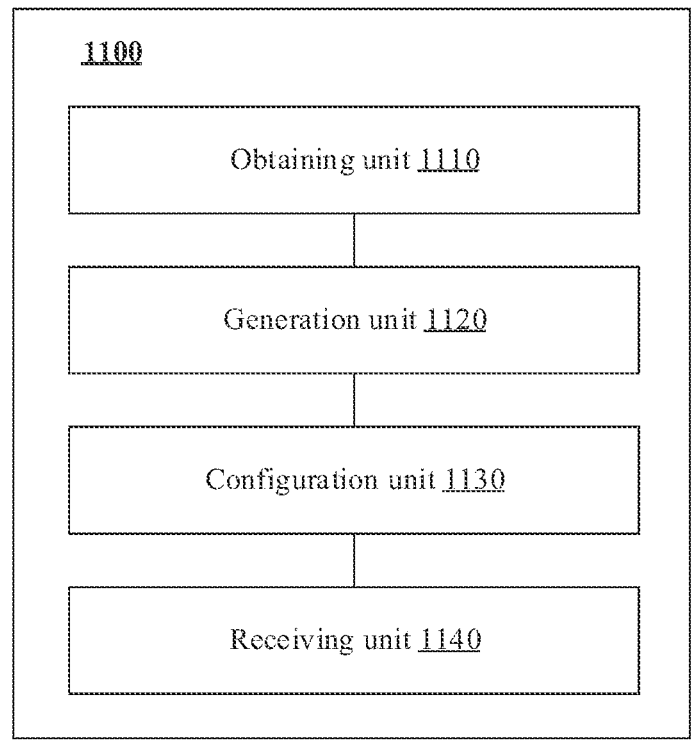
FIG. 11 is a schematic block diagram of a first core network element according to some embodiments.

As shown in FIG. 11, a first core network element 1100 provided in an embodiment of FIG. 11 may include: an obtaining unit 1110, a generation unit 1120, a configuration unit 1130, and a receiving unit 1140. The obtaining unit 1110 may be configured to obtain first PSI information corresponding to a first URSP rule reported by a target user equipment, the first URSP rule being matched with a target service flow initiated by the target user equipment. The generation unit 1120 may be configured to generate a first packet detection rule according to the first URSP rule obtained from the first PSI information. The configuration unit 1130 may be configured to configure the first packet detection rule to a user plane function (UPF) network element of a first protocol data unit (PDU) session, the first PDU session corresponding to the first URSP rule, and the first packet detection rule being used for instructing the UPF network element to detect whether the target service flow transmitted by the target user equipment on the first PDU session is matched with the first packet detection rule, to obtain a first detection result. The receiving unit 1140 is configured to receive the first detection result transmitted by the UPF network element.

In some embodiments, the obtaining unit 1110 is further configured to: when the first PDU session has been established in a process of initiating the target service flow by the target user equipment, obtain the first PSI information from a second core network element in a modification procedure of the first PDU session triggered by the target user equipment. The second core network element may be configured to receive the first PSI information from a third core network element. The third core network element may be configured to receive the first PSI information from the target user equipment.

In some embodiments, the obtaining unit 1110 is further configured to: when that the first PDU session has not been established in a process of initiating the target service flow by the target user equipment, obtain the first PSI information from a second core network element in an establishment procedure of the first PDU session triggered by the target user equipment. The second core network element may be configured to receive the first PSI information from a third core network element. The third core network element may be configured to receive the first PSI information from the target user equipment.

In some embodiments, the first packet detection rule may include at least one of a first IP descriptor, a first domain descriptor, and a first non-IP descriptor.

In some embodiments, the first packet detection rule may include a detection frequency, where the detection frequency may be used for instructing the UPF network element to regularly detect a packet in the target service flow according to the detection frequency.

In some embodiments, the first core network element 1100 may further include a transmission unit, configured to transmit the first packet detection rule to the second core network element. The second core network element may be configured to transmit the first packet detection rule to the UPF network element.

In some embodiments, the receiving unit 1140 may be further configured to: receive the first detection result from the second core network element. The second core network element may be configured to receive the first detection result from the UPF network element.

In some embodiments, the receiving unit 1140 may be further configured to: receive the first detection result when the first detection result indicates that the target service flow is matched with the first packet detection rule; receive the first detection result when the first detection result indicates that the target service flow is not matched with the first packet detection rule; or receive the first detection result when that the first detection result indicates that the target service flow is matched with or not matched with the first packet detection rule.

In some embodiments, the first core network element 1100 may further include: a generation unit, configured to generate URSP rule execution notification information according to the first detection result, where the URSP rule execution notification information is used for indicating an execution situation of a URSP rule in a UE or a group of UE(s), the URSP rule includes the first URSP rule, and the UE or the group of UE(s) includes the target user equipment. The first core network element 1100 may further include a sending unit, configured to transmit the URSP rule execution notification information to an application function (AF) network element.

In some embodiments, the receiving unit 1140 may be further configured to receive a URSP execution situation subscription request message transmitted by the AF network element, where the URSP execution situation subscription request message includes information about the URSP rule and information about the AF network element. The first core network element 1100 may include: a generation unit, configured to authenticate the URSP execution situation subscription request message according to the information about the AF network element, and generating a URSP execution situation subscription response message according to an authentication result. The first core network element 1100 may further include a sending unit, configured to transmit the URSP execution request subscription response message to the AF network element.

In some embodiments, receiving unit 1140 may be further configured to receive URSP rule configuration information transmitted by the AF network element. The first core network element 1100 may include: a generation unit, configured to generate the URSP rule with reference to the URSP rule configuration information. The first core network element 1100 may further include transmit information about the URSP rule to the AF network element.

In some embodiments, the first core network element 1100 may further include a sending unit, configured to transmit blocking indication information corresponding to the first packet detection rule, where the blocking indication information may be used for instructing the UPF network element to block a target service flow that is not matched with the first packet detection rule.

In some embodiments, the generation unit 1120 may be further configured to: when the first detection result indicates that the target service flow is not matched with the first packet detection rule, generate a URSP rule matching error message for indicating that the first URSP rule matched by the target user equipment on the first PDU session is incorrect. The first core network element 1100 may further include a sending unit, configured to transmit the URSP rule matching error message to the target user equipment.

For other content in the embodiment of FIG. 11, reference may be made to other embodiments described above.

Figure 12:
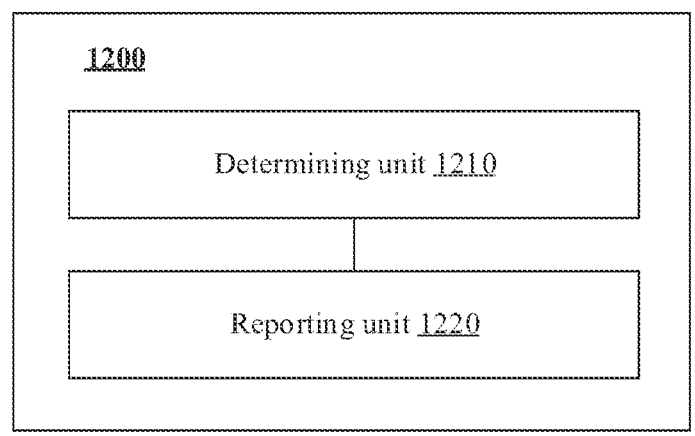
FIG. 12 is a schematic block diagram of a target user equipment according to some embodiments.

As shown in FIG. 12, a target user equipment 1200 provided in an embodiment of FIG. 12 may include a determining unit 1210 and a reporting unit 1220. The determining unit 1210 is configured to determine, in response to initiating a target service flow, a first UE route selection policy (URSP) rule matched with the target service flow, and obtain first policy section identifier (PSI) information corresponding to the first URSP rule. The reporting unit 1220 is configured to report the first PSI information to a first core network element. The first PSI information may be used for instructing the first core network element to generate a first packet detection rule according to the first URSP rule obtained from the first PSI information, and configure the first packet detection rule to a user plane function (UPF) network element of a first protocol data unit (PDU) session. The first core network element may be configured to generate a first packet detection rule according to the first URSP rule obtained from the first PSI information, and configure the first packet detection rule to a user plane function (UPF) network element of a first protocol data unit (PDU) session, the first PDU session corresponding to the first URSP rule. The UPF network element may be configured to detect whether the target service flow transmitted by the target user equipment on the first PDU session is matched with the first packet detection rule, to obtain a first detection result, and transmit the first detection result to the first core network element.

In some embodiments, the reporting unit 1220 may be further configured to: trigger a procedure of modifying the first PDU session if the first PDU session has been established in response to initiating the target service flow. The target user equipment 1200 may further include a sending unit, configured to transmit the first PSI information to a third core network element in the procedure of modifying the first PDU session. In some embodiments, the third core network element may be configured to transmit the first PSI information to the second core network element. The second core network element may be configured to transmit the first PSI information to the first core network element.

In some embodiments, the reporting unit 1220 may be further configured to: trigger a procedure of establishing the first PDU session if the first PDU session has not been established in response to initiating the target service flow. The target user equipment 1200 may further include a sending unit, configured to transmit the first PSI information to a third core network element in the procedure of establishing the first PDU session. The third core network element may be configured to transmit the first PSI information to the second core network element. The second core network element may be configured to transmit the first PSI information to the first core network element. The transmission unit may be further configured to transmit the target service flow on the first PDU session after the first PDU session is established.

In some embodiments, the target user equipment 1200 may further include a receiving unit, configured to receive a URSP rule matching error message from the first core network element, where the URSP rule matching error message may be used for indicating that the first URSP rule matched by the target user equipment on the first PDU session is incorrect. The determining unit 1210 may be further configured to re-match a second URSP rule for the target service flow according to the URSP rule matching error message. The target user equipment 1200 may further include a sending unit, configured to transmit the target service flow on a second PDU session corresponding to the second URSP rule. The first core network element may be further configured to generate the URSP rule matching error message when the first detection result indicates that the target service flow is not matched with the first packet detection rule. For other content in the embodiment of FIG. 12, reference may be made to other embodiments described above.

Figure 13:
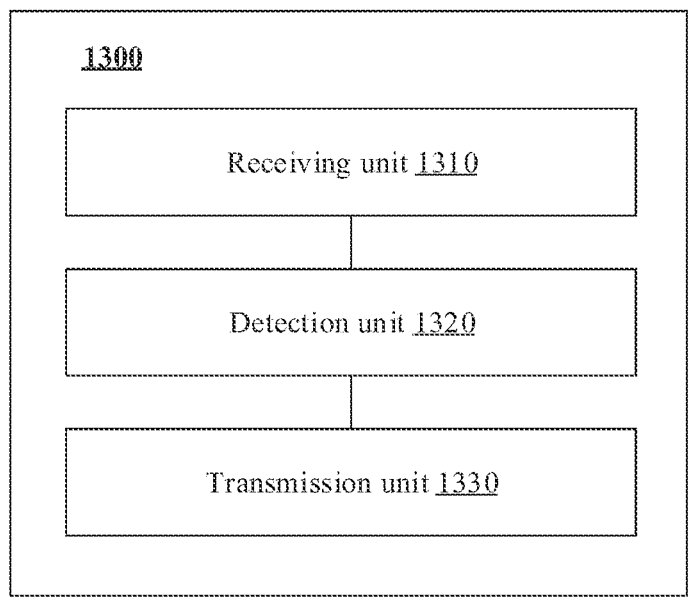
FIG. 13 is a schematic block diagram of a user plane function (UPF) network element according to some embodiments.

As shown in FIG. 13, a user plane function UPF network element 1300 provided in an embodiment of FIG. 13 corresponds to a first PDU session, the first PDU session corresponds to a first URSP rule, the first URSP rule corresponds to first PSI information, and the first URSP rule is matched with a target service flow initiated by a target user equipment. The UPF network element 1300 may include a receiving unit 1310, a detection unit 1320, and a transmission unit 1330. The receiving unit 1310 may be configured to receive a first packet detection rule that is of the first URSP rule and that is transmitted by a first core network element, the first PSI information being used for instructing the first core network element to generate the first packet detection rule according to the first URSP rule obtained from the first PSI information. The detection unit 1320 may be configured to detect whether the target service flow transmitted by the target user equipment on the first PDU session is matched with the first packet detection rule, to obtain a first detection result. The transmission unit 1330 may be configured to transmit the first detection result to the first core network element.

In some embodiments, the receiving unit 1310 may be further configured to: receive the first packet detection rule from a second core network element. The second core network element may be configured to receive the first packet detection rule from the first core network element.

In some embodiments, the UPF network element 1300 may further include a sending unit, configured to send the first detection result to the second core network element. The second core network element may be configured to transmit the first detection result to the first core network element.

In some embodiments, the first packet detection rule may include at least one of a first IP descriptor, a first domain descriptor, and a first non-IP descriptor.

The detection unit 1320 may be configured to perform the following steps: detecting whether the target service flow is matched with the first packet detection rule. If not matched, the obtained first detection result is that the target service flow is not matched with the first packet detection rule; or if matched, the obtained first detection result is that the target service flow is matched with the first packet detection rule.

In some embodiments, the first packet detection rule may include a detection frequency. The detection unit 1320 may be configured to perform the following steps: regularly detecting, according to the detection frequency, whether a packet in the target service flow is matched with the first packet detection rule, and obtaining the first detection result.

In some embodiments, the receiving unit 1310 may be further configured to receive blocking indication information corresponding to the first packet detection rule, where the blocking indication information may be used for instructing the UPF network element to block a target service flow that is not matched with the first packet detection rule. The user plane function (UPF) network element 1300 may further include a blocking unit, configured to block the target service flow if the first detection result is that the target service flow is not matched with the first packet detection rule. For other content in the embodiment of FIG. 13, reference may be made to other embodiments described above.

Figure 14:
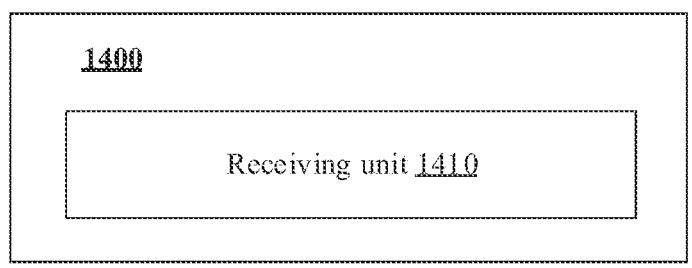
FIG. 14 is a schematic block diagram of an application function (AF) network element according to some embodiments.

As shown in FIG. 14, an AF network element 1400 provided in an embodiment of FIG. 14 may include a receiving unit 1410. The receiving unit 1410 may be configured to receive URSP rule execution notification information transmitted by a first core network element, the URSP rule execution notification information being used for indicating an execution situation of a URSP rule in a UE or a group of UE(s), the URSP rule including a first URSP rule, the UE or the group of UE(s) including a target user equipment, and the first URSP rule being matched with a target service flow indicated by the target user equipment. The first core network element may be configured to obtain first PSI information corresponding to the first URSP rule reported by the target user equipment, generate a first packet detection rule according to the first URSP rule obtained from the first PSI information, and configure the first packet detection rule to a user plane function (UPF) network element of a first protocol data unit (PDU) session, the first PDU session corresponding to the first URSP rule. The UPF network element may be configured to detect whether the target service flow transmitted by the target user equipment on the first PDU session is matched with the first packet detection rule, to obtain a first detection result. The first core network element may be further configured to receive the first detection result, and generate the URSP rule execution notification information according to the first detection result.

In some embodiments, the AF network element 1400 may further include a sending unit, configured to transmit a URSP execution situation subscription request message to the first core network element, where the URSP execution situation subscription request message includes information about the URSP rule and information about the AF network element. The first core network element is further configured to authenticate the URSP execution situation subscription request message according to the information about the AF network element, and generate a URSP execution situation subscription response message according to an authentication result. The receiving unit 1410 may be further configured to receive the URSP execution request subscription response message transmitted by the first core network element.

In some embodiments, the AF network element 1400 may further include a sending unit, configured to transmit URSP rule configuration information to the first core network element. The first core network element may be further configured to generate the URSP rule with reference to the URSP rule configuration information. The receiving unit 1410 may be further configured to receive the information about the URSP rule transmitted by the first core network element. For other content in the embodiment of FIG. 14, reference may be made to other embodiments described above.

Figure 15:
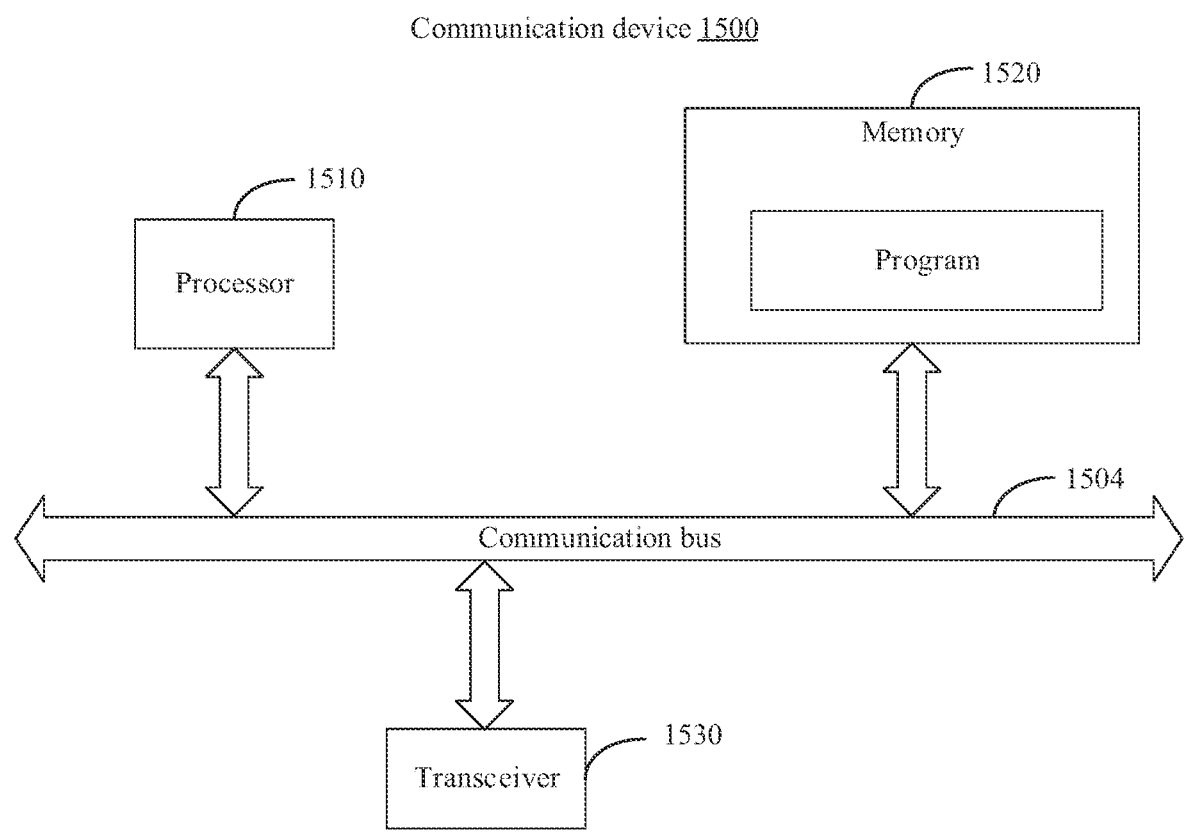
FIG. 15 is a schematic diagram of a communication device according to some embodiments.

FIG. 15 is a schematic diagram of a communication device 1500 according to an embodiment of the present disclosure. The communication device may be a terminal, or may be another communication device, for example, a first core network element and/or a second core network element and/or a third core network element and/or a user plane function, and/or an application function network element. The communication device 1500 shown in FIG. 15 may include a processor 1510. The processor 1510 may invoke a computer program from a memory and run the computer program, to implement the method in the embodiments of the present disclosure. In some embodiments, as shown in FIG. 15, the communication device 1500 may further include a memory 1520. The processor 1510 may invoke the computer program from the memory 1520 and run the computer program, to implement the method in the embodiments of the present disclosure. The memory 1520 may be a component independent of the processor 1510, or may be integrated into the processor 1510. In some embodiments, as shown in FIG. 15, the communication device 1500 may further include a transceiver 1530, and the processor 1510 can control the transceiver 1530 to communicate with another device. Specifically, the transceiver 1530 sends information or data to another device, or receives information or data sent by another device. The transceiver 1530 may include a transmitter and a receiver. The transceiver 1530 may further include an antenna, and a quantity of the antenna can be one or more.

In some embodiments, the communication device 1500 may specifically be the first core network element and/or the second core network element and/or the third core network element and/or the user plane function network element and/or the application function network element in the embodiments of the present disclosure, and the communication device 1500 may implement a corresponding procedure implemented by the first core network element and/or the second core network element and/or the third core network element and/or the user plane function network element and/or the application function network element in the methods in the embodiments of the present disclosure. For brevity, details are not described herein again. In some embodiments, the communication device 1500 may specifically be a mobile terminal/a terminal in the embodiments of the present disclosure, and the communication device 1500 can implement corresponding procedures implemented by the mobile terminal/the terminal in various methods in the embodiments of the present disclosure. For brevity, details are not described herein again.

It should be understood that, the processor of some embodiments may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component, and The processor can implement or execute methods, steps, and logical block diagrams disclosed in the embodiments of the present disclosure. The general-purpose processor may be a microprocessor, or the processor may be any conventional processor and the like. The steps of the methods disclosed with reference to the embodiments of the present disclosure may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware thereof.

It can be understood that, the memory in the various embodiments may be a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories. The foregoing description of the memory is illustrative, but is not limitative.

An embodiment of the present disclosure further provides a computer-readable storage medium, configured to store a computer program.

In some embodiments, the computer-readable storage medium is applicable to the first core network element and/or the second core network element and/or the third core network element and/or the user plane function network element and/or the application function network element in the embodiments of the present disclosure, and the computer program enables a computer to implement a corresponding procedure implemented by the first core network element and/or the second core network element and/or the third core network element and/or the user plane function network element and/or the application function network element in the methods in the embodiments of the present disclosure. For brevity, details are not described herein again.

In some embodiments, the computer-readable storage medium may be applied to the network device in the mobile terminal/the terminal in the embodiments of the present disclosure, and the computer program enables a computer to perform corresponding procedures implemented by the mobile terminal/the terminal in the methods in the embodiments of the present disclosure. For brevity, details are not described herein again.

An embodiment of the present disclosure further provides a computer program product, including computer program instructions. In some embodiments, the computer program product is applicable to the first core network element and/or the second core network element and/or the third core network element and/or the user plane function network element and/or the application function network element in the embodiments of the present disclosure, and the computer program instructions enable a computer to implement a corresponding procedure implemented by the first core network element and/or the second core network element and/or the third core network element and/or the user plane function network element and/or the application function network element in the methods in the embodiments of the present disclosure. For brevity, details are not described herein again. In some embodiments, the computer program product may be applied to the mobile terminal/the terminal in the embodiments of the present disclosure, and the computer program instruction enables a computer to perform corresponding procedures implemented by the mobile terminal/the terminal in the methods in the embodiments of the present disclosure. For brevity, details are not described herein again.

An embodiment of the present disclosure further provides a computer program. In some embodiments, the computer program is applicable to the first core network element and/or the second core network element and/or the third core network element and/or the user plane function network element and/or the application function network element in the embodiments of the present disclosure, and when the computer program is run on a computer, the computer is enabled to implement a corresponding procedure implemented by the first core network element and/or the second core network element and/or the third core network element and/or the user plane function network element and/or the application function network element in the methods in the embodiments of the present disclosure. For brevity, details are not described herein again. In some embodiments, the computer program may be applied to the network device in the mobile terminal/the terminal in the embodiments of the present disclosure, and when the computer program is run on the computer, the computer is enabled to perform corresponding procedures implemented by the mobile terminal/the terminal in the methods in the embodiments of the present disclosure. For brevity, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

What is claimed is:

1. A user equipment (UE) route selection policy (URSP) detection method, performed by a first core network element, the URSP detection method comprising:
obtaining first policy section identifier (PSI) information corresponding to a first URSP rule corresponding to a target user equipment, the first URSP rule being matched with a target service flow corresponding to the target user equipment;
generating a first packet detection rule based on the first URSP rule that corresponds to the first PSI information;
configuring the first packet detection rule to a user plane function (UPF) network element of a first protocol data unit (PDU) session, the first PDU session corresponding to the first URSP rule; and
receiving, from the UPF network element, a first detection result based on the first packet detection rule and indicating whether the target service flow associated with the first PDU session matches the first packet detection rule.

2. The URSP detection method according to claim 1, wherein the obtaining comprises:
when the first PDU session has been established in a process of initiating the target service flow, obtaining the first PSI information from a second core network element in a modification procedure of the first PDU session.

3. The URSP detection method according to claim 1, wherein the obtaining comprises:
when the first PDU session has not been established in a process of initiating the target service flow, obtaining the first PSI information from a second core network element in an establishment procedure of the first PDU session.

4. The URSP detection method according to claim 1, wherein the first packet detection rule comprises at least one of a first IP descriptor, a first domain descriptor, or a first non-IP descriptor.

5. The URSP detection method according to claim 1, wherein the first packet detection rule comprises a detection frequency at which the UPF network element is to regularly detect a packet in the target service flow.

6. The URSP detection method according to claim 1, wherein the receiving comprises one of:
receiving the first detection result when the first detection result indicates that the target service flow matches the first packet detection rule;
receiving the first detection result when the first detection result indicates that the target service flow does not match the first packet detection rule; or
receiving the first detection result when the first detection result indicates that the target service flow matches or does not match the first packet detection rule.

7. The URSP detection method according to claim 1, wherein the target user equipment includes a user equipment (UE) or a group of UEs, and
the URSP detection method further comprises:
generating URSP rule execution notification information based on the first detection result, the URSP rule execution notification information indicating an execution situation of the first URSP rule in the UE or the group of UEss; and
transmitting the URSP rule execution notification information to an application function (AF) network element.

8. The URSP detection method according to claim 1, further comprising:
transmitting blocking indication information corresponding to the first packet detection rule, the blocking indication information instructing the UPF network element to block a target service flow that does not match the first packet detection rule.

9. The URSP detection method according to claim 2, wherein the first packet detection rule comprises at least one of a first IP descriptor, a first domain descriptor, or a first non-IP descriptor.

10. The URSP detection method according to claim 3, wherein the first packet detection rule comprises at least one of a first IP descriptor, a first domain descriptor, or a first non-IP descriptor.

11. A first core network element, comprising:
at least one memory configured to store computer program code; and
at least one processor configured to access the at least one memory and operate according to the computer program code, the computer program code including:
obtaining code configured to cause at least one of the at least one processor to obtain first policy section identifier (PSI) information corresponding to a first UE route selection policy (URSP) rule reported by a target user equipment, the first URSP rule being matched with a target service flow initiated by the target user equipment;
generating code configured to cause at least one of the at least one processor to generate a first packet detection rule according to the first URSP rule obtained from the first PSI information;
configuration code configured to cause at least one of the at least one processor to configure the first packet detection rule to a user plane function (UPF) network element of a first protocol data unit (PDU) session, the first PDU session corresponding to the first URSP rule, and the first packet detection rule being used for instructing the UPF network element to obtain a first detection result, the first detection result representing whether the target service flow transmitted by the target user equipment on the first PDU session is matched with the first packet detection rule; and
receiving code configured to cause at least one of the at least one processor to receive the first detection result transmitted by the UPF network element.

12. The first core network element according to claim 11, wherein the obtaining code is further configured to cause the at least one of the at least one processor to:
when the first PDU session has been established in a process of initiating the target service flow, obtain the first PSI information from a second core network element in a modification procedure of the first PDU session triggered.

13. The first core network element according to claim 11, wherein the obtaining code is further configured to cause the at least one of the at least one processor to:
when the first PDU session has not been established in a process of initiating the target service flow, obtain the first PSI information from a second core network element in an establishment procedure of the first PDU session.

14. The first core network element according to claim 11, wherein the first packet detection rule comprises at least one of a first IP descriptor, a first domain descriptor, or a first non-IP descriptor.

15. The first core network element according to claim 11, wherein the first packet detection rule comprises a detection frequency at which the UPF network element is to regularly detect a packet in the target service flow according to the detection frequency.

16. The first core network element according to claim 11, wherein the receiving code is further configured to cause the at least one of the at least one processor to:
   receive the first detection result when the first detection result indicates that the target service flow matches the first packet detection rule;
   receive the first detection result when the first detection result indicates that the target service flow is does not match the first packet detection rule; or
   receive the first detection result when the first detection result indicates that the target service flow matches or does not match the first packet detection rule.

17. The first core network element according to claim 11, wherein the target user equipment includes a user equipment (UE) or a group of UEs, and
   the first core network element further comprises:
   notification code configured to cause at least one of the at least one processor to generate URSP rule execution notification information based on the first detection result, the URSP rule execution notification information for indicating an execution situation of the first URSP rule in the UE or the group of UEs; and
   transmitting code configured to cause at least one of the at least one processor to transmit the URSP rule execution notification information to an application function (AF) network element.

18. The first core network element according to claim 11, further comprising:
   transmitting code configured to cause at least one of the at least one processor to transmit blocking indication information corresponding to the first packet detection rule, the blocking indication information instructing the UPF network element to block a target service flow that does not match the first packet detection rule.

19. The first core network element according to claim 12, wherein the first packet detection rule comprises at least one of a first IP descriptor, a first domain descriptor, or a first non-IP descriptor.

20. A non-transitory computer-readable storage medium that stores a computer program which, when accessed and executed by a communication device, causes the communication device to at least:
   obtain first policy section identifier (PSI) information corresponding to a first URSP rule corresponding to a target user equipment, the first URSP rule being matched with a target service flow corresponding to the target user equipment;
   generate a first packet detection rule based on the first URSP rule that corresponds to the first PSI information;
   configure the first packet detection rule to a user plane function (UPF) network element of a first protocol data unit (PDU) session, the first PDU session corresponding to the first URSP rule; and
   receive, from the UPF network elements, a first detection result based on the first packet detection rule and indicating whether the target service flow associated with the first PDU session matches the first packet detection rule.

* * * * *